(12) United States Patent
Sagisaka

(10) Patent No.: US 9,094,265 B1
(45) Date of Patent: Jul. 28, 2015

(54) RECEIVING APPARATUS AND DEMODULATION METHOD

(71) Applicant: Panasonic Corporation, Osaka (JP)

(72) Inventor: Masahiko Sagisaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/620,168

(22) Filed: Feb. 11, 2015

(30) Foreign Application Priority Data

Feb. 25, 2014 (JP) ................. 2014-033940

(51) Int. Cl.
*H04L 27/14* (2006.01)
*H04L 27/26* (2006.01)
*H04L 1/00* (2006.01)

(52) U.S. Cl.
CPC .............. *H04L 27/14* (2013.01); *H04L 1/0054* (2013.01); *H04L 27/265* (2013.01)

(58) Field of Classification Search
CPC ..... H04L 27/14; H04L 27/265; H04L 1/0054; H04L 27/22–27/2338; H04B 1/16–1/302
See application file for complete search history.

(56) References Cited

U.S. PATENT DOCUMENTS 5,208,835 A * 5/1993 Weeks et al. .................. 375/272
2002/0167368 A1 * 11/2002 Yoshida ........................ 332/100

FOREIGN PATENT DOCUMENTS

JP 9-130300 5/1997

* cited by examiner

*Primary Examiner* — Dac Ha
(74) *Attorney, Agent, or Firm* — Seed IP Law Group PLLC

(57) ABSTRACT

A frequency range for Fourier transform is controlled and a digital signal is subjected to fast Fourier transform within the controlled range, whereby a plurality of frequency components (FFT signals) in the digital signal are detected. A transmission rate of a received signal is determined using the detected FFT signals and the FFT signals are demodulated by an operation at a speed corresponding to the determined transmission rate.

6 Claims, 7 Drawing Sheets

RECEIVING APPARATUS AND DEMODULATION METHOD

CROSS REFERENCES TO RELATED APPLICATIONS

This application claims priority to Japanese Patent Application No. 2014-033940, filed on Feb. 25, 2014, the contents of which are hereby incorporated by reference.

BACKGROUND

1. Technical Field

The present disclosure relates to a receiving apparatus and a demodulation method for receiving and demodulating a frequency shift keying (FSK) modulated signal.

2. Description of the Related Art

As one of the modulation methods for digital communication, a frequency shift keying (FSK) modulation method is known where the values of digital signals, "0" and "1", are assigned to different frequencies, with which digital signals are modulated. An example of a demodulation method for FSK modulated signals is described in Japanese Unexamined Patent Application Publication No. 9-130300.

FIG. 7 is a block diagram illustrating a receiving apparatus (specifically, a multi-frequency shift keying demodulator) described in Japanese Unexamined Patent Application Publication No. 9-130300. The receiving apparatus in FIG. 7 includes an antenna 1, a first demodulator 2 employing a frequency hopping spread spectrum method, and a second demodulator (MFSK demodulator) 3 employing a MFSK method. The first demodulator 2 includes a mixer 5, a frequency synthesizer 6, and a hopping pattern generator 7. The second demodulator 3 includes a band pass filter (BPF) 8, an analog-to-digital (AD) converter 9, a fast Fourier transformer (FFT) 10, a maximum value selector 11, and a decoder circuit 12.

The mixer 5 generates a first decode signal by synchronizing and mixing a spread spectrum signal which is received by the antenna 1 and amplified by an amplifier (not illustrated) with a hopping local signal provided by the frequency synthesizer 6 and by performing an inverse spread spectrum process on the spread spectrum signal. The BPF 8 removes an unnecessary signal from the first decode signal output from the mixer 5. The AD converter 9 converts the first decode signal output from the BPF 8, which is an analog signal, into a digital signal.

The FFT 10 truncates the digital signal output from the AD converter 9 by a predetermined time window and performs fast Fourier transform to simultaneously detect a plurality of frequency components (FFT signals) in the digital signal.

The maximum value selector 11 detects a change in a frequency component representing plural maximum amplitude values in the FFT signal output from the FFT 10 and generates a code word data signal S1 having plural code word chips as a received signal, according to the change in the frequency component. Further, the maximum value selector 11 performs maximum likelihood detection between the code word data signal S1 and a plurality of code word pattern data signals S2 that are set in advance in accordance with bit patterns of the second demodulation data, and thereby selects the code word pattern data signal S2 which has the highest matching degree with the code word data signal S1.

The decoder circuit 12 decodes the code word pattern data signal S2 selected by the maximum value selector 11 into a digital signal having the predetermined number of bits, and outputs the signal as the second demodulation data signal (demodulation data).

As described above, in the multi-frequency shift keying demodulator according to Japanese Unexamined Patent Application Publication No. 9-130300, fast Fourier transform is performed on the FSK modulated signal to detect a plurality of frequency components included in the modulated signal, and a data signal is obtained using the plural frequency components. The technique described in Japanese Unexamined Patent Application Publication No. 9-130300 does not use an envelope detector or require a plurality of band pass filters. Therefore, demodulation can be performed accurately at a high speed without variations in characteristics.

However, in the above conventional technique, Fourier transform calculation is performed for each frequency component; therefore, a large amount of calculation is performed, resulting in an increase in circuit size and power consumption. In addition, in multi-rate communication where a system is able to set a plurality of transmission rates having different bandwidths, the above conventional technique causes a significant increase in circuit size and power consumption, because the number of demodulation processing blocks would need to be the same as the number of transmission rates in order to perform a receiving process to simultaneously receive data at a plurality of transmission rates.

SUMMARY

One non-limiting and exemplary embodiment provides a receiving apparatus which can operate at a high speed while reducing circuit size and power consumption in a case of multi-rate communication.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a receiving apparatus that receives and demodulates a frequency shift keying (FSK) modulated signal that is transmitted at a transmission rate selected from a plurality of transmission rates with different bandwidths. The receiving apparatus includes a calculation range control section that controls a frequency range used for detecting a frequency component, on the basis of a Mark frequency and a Space frequency; a frequency component detector that detects a frequency component in the FSK modulated signal, on the basis of the controlled frequency range; a mode determination section that determines a transmission rate of the FSK modulated signal, on the basis of the detected frequency component; and a demodulation section that operates at a speed corresponding to the transmission rate and demodulates the detected frequency component.

In another general aspect, the techniques disclosed here feature a demodulation method for a frequency shift keying (FSK) modulated signal that is transmitted at a transmission rate selected from a plurality of transmission rates with different bandwidths. The method includes controlling a frequency range for a calculation for detecting a frequency component on the basis of a Mark frequency and a Space frequency; detecting the frequency component in the FSK modulated signal on the basis of the controlled frequency range; determining a transmission rate of the FSK modulated signal on the basis of the detected frequency component; and demodulating the detected frequency component by an operation at a speed corresponding to the determined transmission rate.

These general and specific aspects may be implemented using a system, a method, and a computer program, and any combination of systems, methods, and computer programs.

According to this disclosure, when performing a frequency detection process, a frequency range can be controlled so that certain frequency components needed to achieve a desirable demodulation accuracy are used. Therefore, the amount of calculation in the frequency component detector can be reduced. In addition, by utilizing a characteristic feature of the frequency detector, a wide signal processing bandwidth, a transmission rate can be determined after a step by a frequency detector to enable demodulation. Thus, in a receiving apparatus, a high-speed operation can be performed, while the circuit size and power consumption can be reduced in a case where multi-rate communication is performed.

DETAILED DESCRIPTION

Hereinafter, an Embodiment of this disclosure will be described in detail with reference to the drawings. Note that in the following description, binary FSK modulation is employed as FSK modulation.

Embodiment

Figure 1:
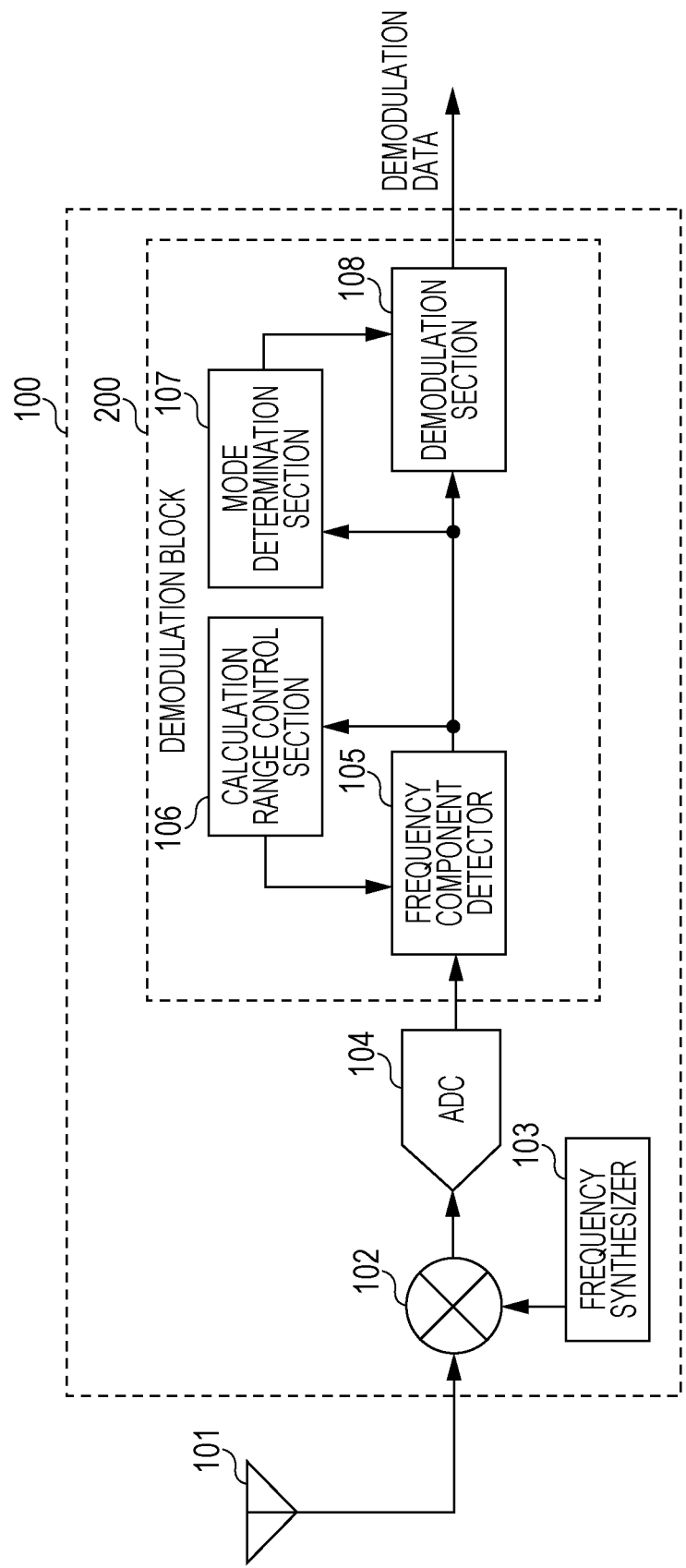
FIG. 1 illustrates a configuration of a receiving apparatus according to an embodiment of this disclosure.

FIG. 1 is a block diagram illustrating a configuration of a receiving apparatus according to an embodiment of this disclosure. As illustrated in FIG. 1, a receiving apparatus 100 includes an antenna 101, a mixer 102, a frequency synthesizer 103, an analog-to-digital converter (ADC) 104, and a demodulation block 200 as main components. The demodulation block 200 includes a frequency component detector 105, a calculation range control section 106, a mode determination section 107, and a demodulation section 108.

The mixer 102 mixes a received high-frequency signal, which is received by the antenna 101 and amplified by an amplifier (not illustrated), with a local signal input from the frequency synthesizer 103 to generate an intermediate-frequency analog signal. The mixer 102 outputs the intermediate-frequency analog signal to the ADC 104.

The ADC 104 converts the analog signal output from the mixer 102 into a digital signal. The ADC 104 outputs the digital signal to the frequency component detector 105.

The frequency component detector 105 includes a Fourier transform calculator. The frequency component detector 105 performs fast Fourier transform on the digital signal output from the ADC 104 within a range indicated by the calculation range control section 106 to detect a plurality of frequency components (FFT signals) in the digital signal.

Note that in multi-rate communication, the frequency component detector 105 detects the frequency components at a speed of a common multiple of all transmission rates which are used, whereby the overall circuit size can be reduced.

The frequency component detector 105 outputs the FFT signals to the calculation range control section 106, the mode determination section 107, and the demodulation section 108. Note that details of the frequency component detector 105 will be described later.

The calculation range control section 106 uses the FFT signal output from the frequency component detector 105 and determines a frequency range in which Fourier transform calculation is performed. The calculation range control section 106 indicates the range to the frequency component detector 105. Note that details of the calculation range control section 106 will be described later.

The mode determination section 107 determines the transmission rate of the received signal using the FFT signal output from the frequency component detector 105 and outputs the determination result to the demodulation section 108. Note that details of the mode determination section 107 will be described later.

The demodulation section 108 operates at a speed corresponding to the transmission rate determined by the mode determination section 107 and decodes the FFT signal output from the frequency component detector 105 into a digital signal that has a predetermined number of bits. The demodulation section 108 outputs the digital signal as a second demodulation data signal (demodulation data). Note that details of the demodulation section 108 will be described later.

Figure 2A:
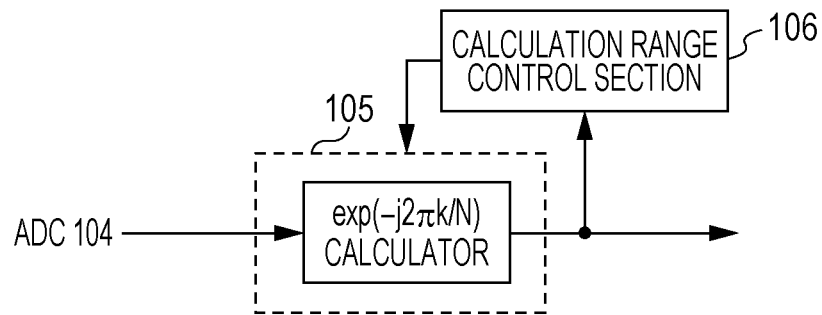
FIGS. 2A and 2B each illustrate a configuration of a frequency component detector according to an embodiment of this disclosure.
Figure 2B:
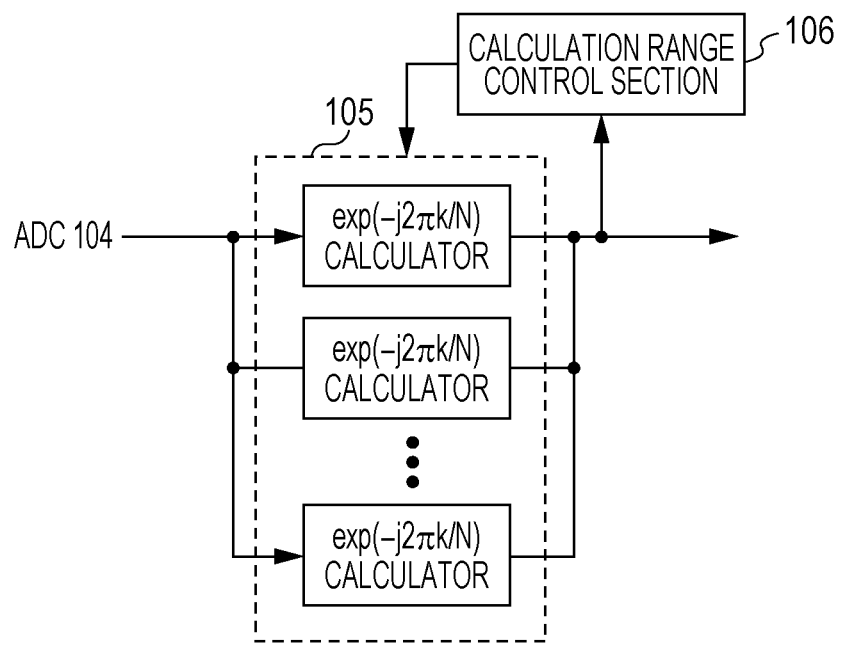

Next, an internal structure of the frequency component detector 105 will be described with reference to FIGS. 2A and 2B. Two possible internal structures for the frequency component detector 105 are illustrated in FIGS. 2A and 2B. FIG. 2A illustrates a case where a single calculator is used. FIG. 2B illustrates a case where a plurality of calculators are used to perform parallel operations.

In this embodiment, discrete Fourier transform (DFT) is employed as Fourier transform. In the DFT, a digital signal is truncated according to a predetermined time window, and Fourier transform is performed to extract a plurality of frequency components from the digital signal. In general, in DFT, operations are performed as expressed by the following formula (1), where $X_q$ represents a q-th signal of a series of signals input to the calculator, $S_k$ represents a frequency component of the frequency k obtained via the Fourier transform, q=0 to N−1, and k=0 to N−1.

$$S_k = \sum_{q=0}^{N-1} x_q \exp\left(\frac{-j2\pi qk}{N}\right) \quad (1)$$

Formula (1) means that each of the signals from $X_0$ to $X_{N-1}$ is multiplied by $\exp(-j2\pi qk/N)$ and added to calculate $S_k$, and such a calculation is repeated N times in relation to k. Therefore, when k is a small number, the amount of Fourier transform calculation can be reduced.

In the case illustrated in FIG. 2A, a single calculator repeats the calculation for q (0 to N−1) and k (0 to N−1). In this way, the circuit size can be made smaller than that in the case illustrated in FIG. 2B. In addition, in the case illustrated in FIG. 2A, when k in the calculation can be reduced, the time required for the calculation can be made smaller than the time required for the calculation in conventional techniques.

In the case of FIG. 2B, calculators for k each repeat the calculation for q (0 to N−1). In such a manner, compared with the case of FIG. 2A, the time required for the calculation can be reduced. In addition, in the case of FIG. 2B, when k in the calculation can be reduced, the circuit size for the calculation can be made smaller than the circuit size required for the calculation in conventional techniques.

In this embodiment, in both cases of FIG. 2A and FIG. 2B, the frequency component detector 105 performs Fourier transform on the basis of the k value indicated by the calculation range control section 106. Therefore, the amount of Fourier transform calculation can be reduced in this embodiment.

Figure 3:
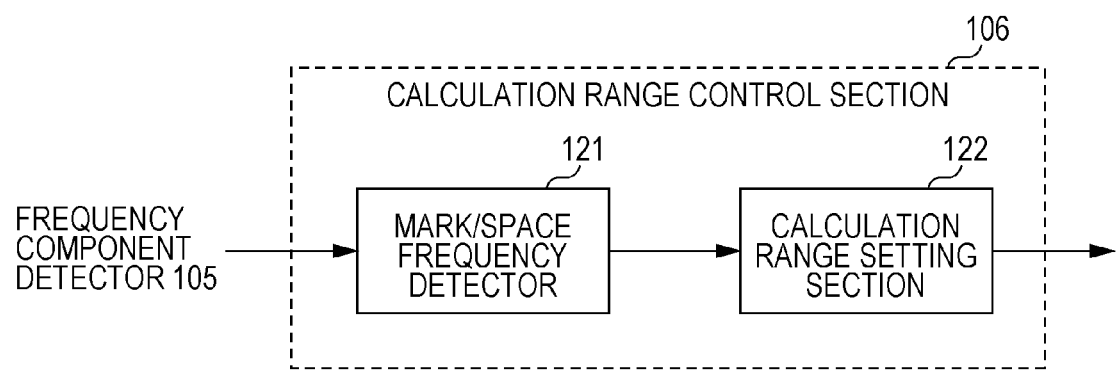
FIG. 3 illustrates a configuration of a calculation range control section in a receiving apparatus according to an embodiment of this disclosure.

Next, an internal structure of the calculation range control section 106 will be described with reference to FIG. 3. The calculation range control section 106 includes a Mark/Space frequency detector 121, and a calculation range setting section 122.

In FSK modulation, the status of each data signal (in a case of a digital signal, 0 or 1) is assigned to different frequencies. Specifically, when the central frequency (direct current component) of a carrier wave is $S_0$, the digital signal "1" is assigned to the frequency of $S_0+\Delta S$, whereas the digital signal "0" is assigned to the frequency of $S_0-\Delta S$. The frequency of $S_0+\Delta S$ is referred to as a Mark frequency, whereas the frequency of $S_0-\Delta S$ is referred to as a Space frequency.

Figure 4:
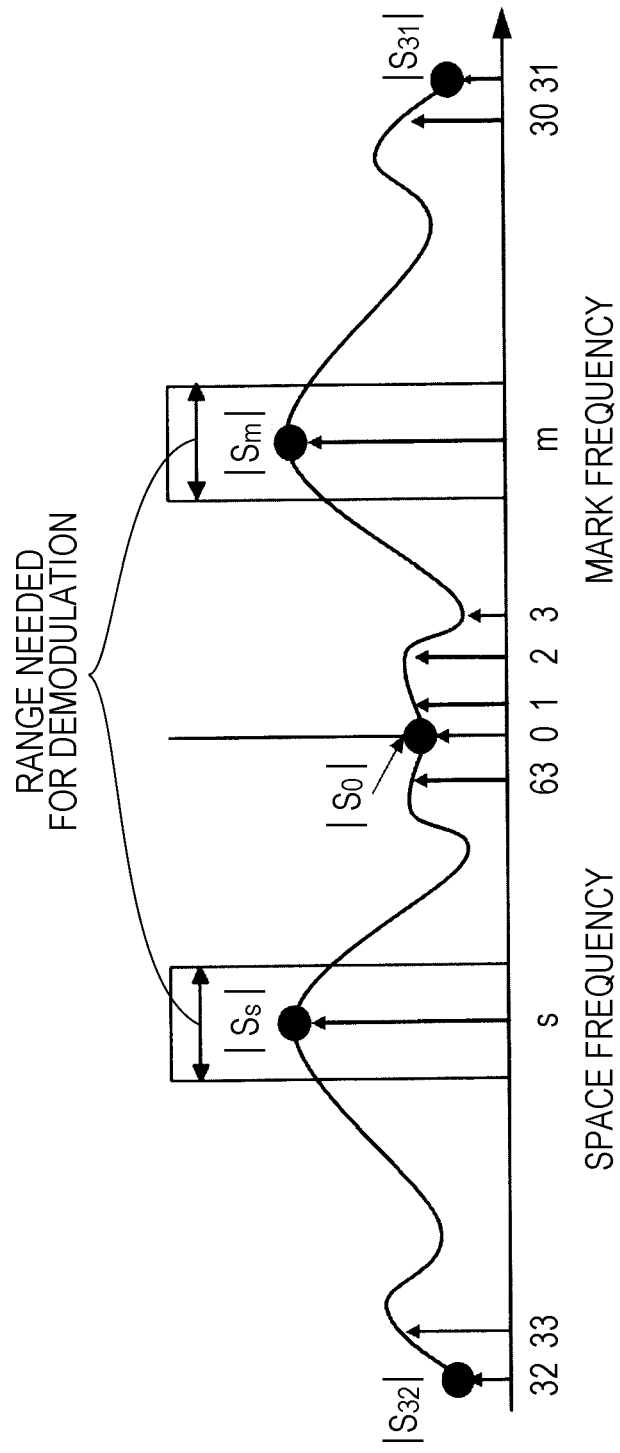
FIG. 4 illustrates a frequency spectrum of an FSK modulated signal according to an embodiment of this disclosure.

FIG. 4 illustrates a frequency spectrum of an FSK modulated signal. In FIG. 4, the horizontal axis represents the frequency, and the vertical axis represents the reception level. Note that FIG. 4 illustrates an example where N is equal to 64. As illustrated in FIG. 4, the frequency spectrum of the frequency components $S_k$ output from the frequency component detector 105 is substantially symmetrical about the central frequency (direct current component) $S_0$ of the carrier wave. Among the positive frequency components ($S_1$ to $S_{31}$), the reception level peaks at the Mark frequency $S_m$, whereas among the negative frequency components ($S_{32}$ to $S_{63}$), the reception level peaks at the Space frequency $S_s$.

The Mark/Space frequency detector 121 detects the peak value of the reception level among the positive frequency components and detects the frequency having the peak value as the Mark frequency. Similarly, the Mark/Space frequency detector 121 detects the peak value of the reception level among the negative frequency components and detects the frequency having the peak value as the Space frequency. Then, the Mark/Space frequency detector 121 outputs data indicating the detected Mark and Space frequencies to the calculation range setting section 122.

The calculation range setting section 122 sets a range including each of the Mark frequency and Space frequency as the frequency range on which Fourier transform calculation is performed. The calculation range setting section 122 then outputs a control signal expressing k which represents the set range to the frequency component detector 105.

When the calculation range setting section 122 sets the range, for example, any of the following methods can be employed: (1) a method in which a range between minus α to plus α (α is a predetermined fixed value) from each of the Mark frequency and the Space frequency is employed; (2) a method in which a range of frequencies having a certain proportion relative to the reception level of the Mark frequency or the Space frequency is employed; and (3) a method in which a width of the range is determined in accordance with the gap between the Mark frequency and the Space frequency. As an example of the third case, when the gap between the Mark frequency and the Space frequency is 100 kHz, the range is set to be between minus 10% and plus 10% from each of the Mark frequency and the Space frequency, and when the gap between the Mark frequency and the Space frequency is 200 kHz, the range is set to be between minus 15% and plus 15% from each of the Mark frequency and the Space frequency, for example.

Figure 5:
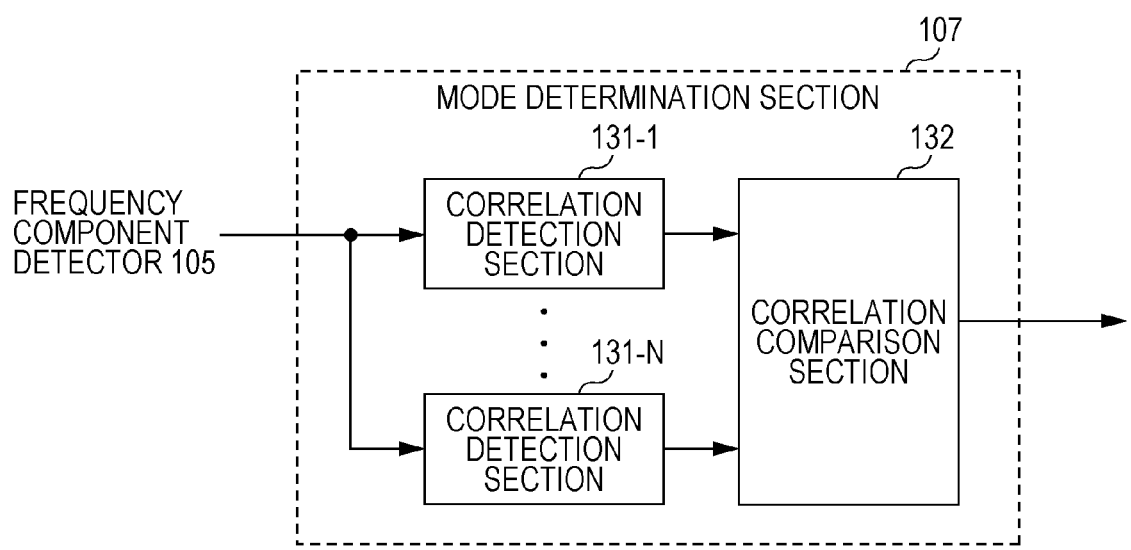
FIG. 5 illustrates a configuration of a mode determination section according to an embodiment of this disclosure.

Next, an internal structure of the mode determination section 107 will be described with reference to FIG. 5. The mode determination section 107 includes N correlation detection sections 131 and the correlation comparison section 132. Note that N is a number larger than 1 and equal to the number of transmission rates which the system is able to set.

Each of the correlation detection section 131 obtains the relationship between a predetermined signal pattern of the predetermined transmission rate and the FFT signal output from the frequency component detector 105, and outputs a correlation value to the correlation comparison section 132. Note that the predetermined transmission rates of the correlation detection sections 131 are selected from the transmission rates which the system is able to set and are different from one another. The correlation detection sections 131 use a common signal pattern.

The correlation comparison section 132 compares the correlation values output from the correlation detection sections 131 corresponding to respective transmission rates. The correlation comparison section 132 identifies a transmission rate corresponding to the maximum correlation value as the transmission rate of the received signal and outputs a signal expressing the determination result to the demodulation section 108.

In the above manner, the demodulation mode of the received signal can be estimated. Accordingly, the receiving apparatus 100 does not need to receive in advance data indicating the demodulation mode from a sending device of a correspondence, and thus the transmission efficiency can be improved. In addition, a single demodulation block can receive signals at any transmission rate; therefore, the circuit size and power consumption can be made smaller than those required for the calculation in conventional techniques.

Figure 6:
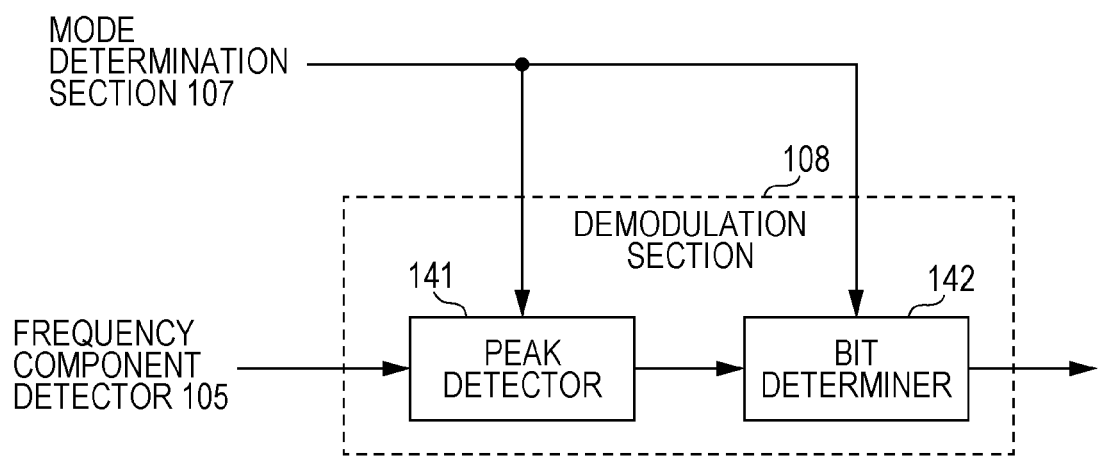
FIG. 6 illustrates a configuration of a demodulation section in a receiving apparatus according to an embodiment of this disclosure.
Figure 7:
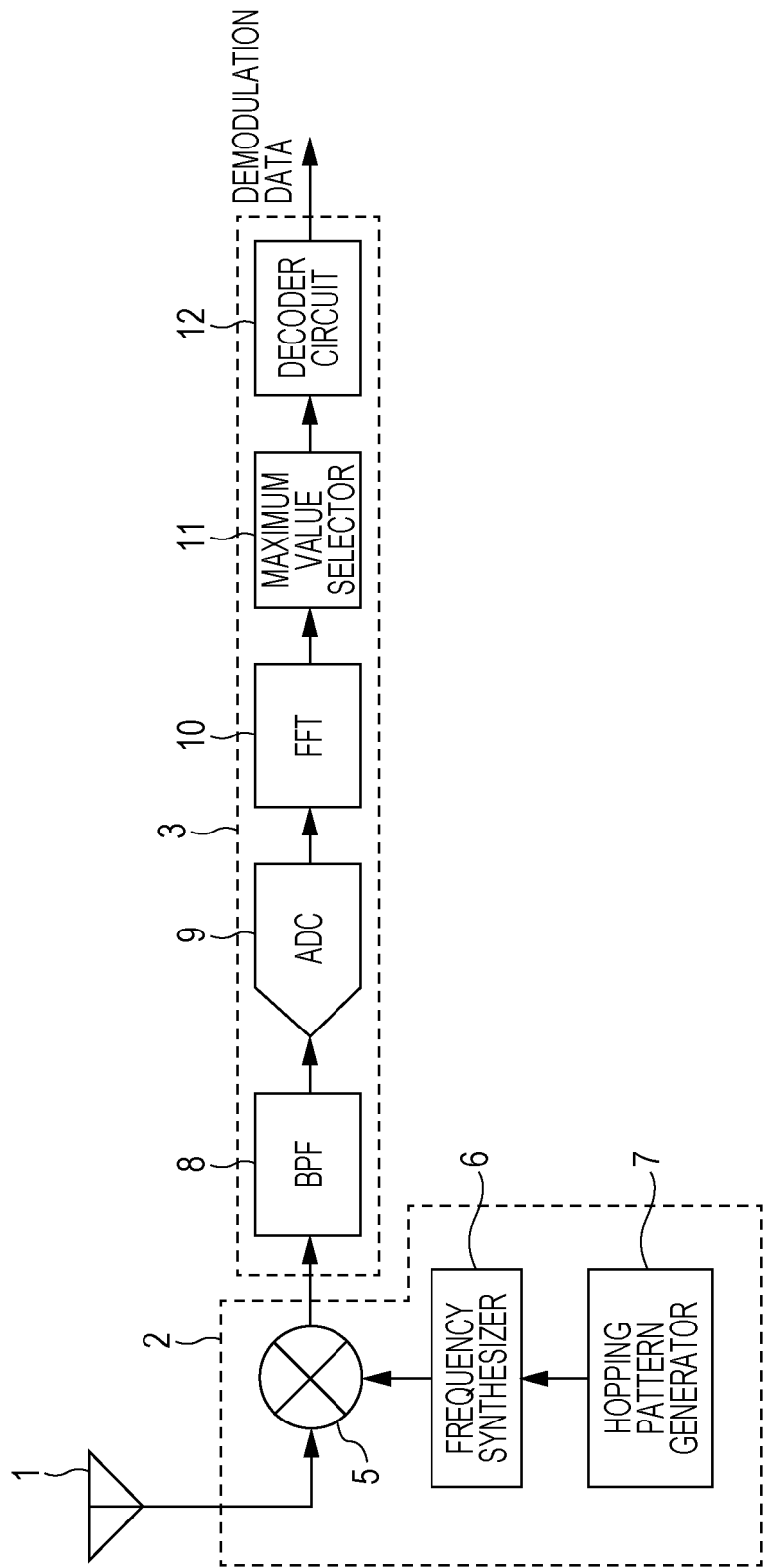
FIG. 7 illustrates a conventional receiving apparatus.

Next, an internal structure of the demodulation sections 108 will be described with reference to FIG. 6. The demodulation section 108 includes a peak detector 141 and a bit determiner 142.

The peak detector 141 operates at a rate corresponding to the transmission rate determined by the correlation comparison section 132 and detects the peak reception level of the FFT signal output from the frequency component detector 105. The peak detector 141 outputs data indicating the frequency of the peak value (hereinafter, referred to as a peak frequency) to the bit determiner 142.

The bit determiner 142 operates at a rate corresponding to the transmission rate identified by the correlation comparison section 132. The bit determiner 142 determines the bit of each symbol on the basis of the frequency data output from the peak detector 141, decodes the signal to a digital signal having a predetermined number of bits, then outputs the digital signal as a second demodulation data signal (demodulation data).

As described above, according to this embodiment, the Mark and Space frequencies in the FFT signal are detected, and Fourier transform calculation is performed on certain frequency components including the Mark and Space frequencies; therefore, the amount of Fourier transform calculation can be reduced.

Note that during demodulation of an FSK modulated signal, a sufficiently high demodulation accuracy can be achieved by Fourier transform on certain frequency components which are deemed necessary instead of by Fourier transform on every frequency component. This is because the demodulation needs FSK-modulated data signals, which have a Mark frequency and a Space frequency; therefore, the frequency components without the Mark and Space frequencies are regarded as noise components and are not necessary for demodulation.

Thus, according to this disclosure, the amount of calculation in the frequency component detector can be reduced, which can lead to high-speed operation and reduction in circuit size and power consumption of the receiving apparatus.

Further, according to this disclosure, one mode determination section can determine the transmission rate of the received signal using FFT signals; therefore, in multi-rate communication, one receiving system can simultaneously receive data at a plurality of transmission rates, which reduces the circuit to a size smaller than that required for the calculation in conventional techniques.

Note that although in the embodiment described thus far, DFT, which is the simplest calculation method for extracting a frequency component, is used, this disclosure is not limited thereto. Another calculation method such as fast Fourier transform (FFT) or short-time DFT (ST-DFT) may be employed.

Further, in the embodiment described thus far, the frequency range is set on the basis of the output signal of the frequency component detector 105; however, this disclosure is not limited thereto. Another method may be used, for example, the frequency range may be set on the basis of modulation data which is prepared in advance.

According to this disclosure, a reduction in circuit size and power consumption of the receiving apparatus can be realized while having an advantage of high-speed operation. Therefore, this disclosure can be applied in the field of low-power radio transmission such as in sensor wireless networks.

What is claimed is:

1. A receiving apparatus that receives and demodulates a frequency shift keying (FSK) modulated signal that is transmitted at a transmission rate selected from a plurality of transmission rates with different bandwidths, the receiving apparatus comprising:

a calculation range controller that controls a frequency range used for detecting a frequency component, on the basis of a Mark frequency and a Space frequency;

a frequency component detector that detects a frequency component in the FSK modulated signal, on the basis of the controlled frequency range;

a mode determiner that determines the transmission rate of the FSK modulated signal, on the basis of the detected frequency component; and a demodulator that operates at a speed corresponding to the transmission rate and demodulates the detected frequency component.

2. The receiving apparatus according to claim 1, wherein the frequency component detector detects the frequency component at a speed that is a common multiple of the plurality of transmission rates.

3. The receiving apparatus according to claim 1, wherein the calculation range controller detects the Mark frequency and the Space frequency on the basis of an output from the frequency component detector.

4. The receiving apparatus according to claim 1, wherein the calculation range controller detects from among positive frequency components a frequency that has a peak reception level as the Mark frequency and from among negative frequency components a frequency that has a peak reception level as the Space frequency.

5. The receiving apparatus according to claim 1, wherein the calculation range control section estimates a demodulation mode on the basis of the Mark frequency and the Space frequency.

6. A demodulation method for a frequency shift keying (FSK) modulated signal that is transmitted at a transmission rate selected from a plurality of transmission rates with different bandwidths, the demodulation method comprising:

controlling a frequency range for detecting a frequency component on the basis of a Mark frequency and a Space frequency;

detecting the frequency component in the FSK modulated signal on the basis of the controlled frequency range;

determining a transmission rate of the FSK modulated signal on the basis of the detected frequency component; and demodulating the detected frequency component by an operation at a speed corresponding to the determined transmission rate.

* * * * *